United States Patent Office 3,829,502
Patented Aug. 13, 1974

3,829,502
PROCESS FOR THE PREPARATION OF HYDROXY-HYDROPEROXIDES FROM OLEFINS
Anna Maria Mattucci, Turin, and Emilio Perrotti, San Donato Milanese, Italy, assignors to Snam Progetti, S.p.A., San Donato Milanese, Italy
No Drawing. Filed Sept. 5, 1969, Ser. No. 855,738
Claims priority, application Italy, Sept. 5, 1968, 20,873/68, Patent 843,594
Int. Cl. C07c 73/06
U.S. Cl. 260—610 R   6 Claims

ABSTRACT OF THE DISCLOSURE

A β-hydroxy-hydroperoxide represented by the formula:

$$\begin{array}{c} \text{OH} \quad \text{OOH} \\ | \quad\quad | \\ R-C-----C-R_2 \\ | \quad\quad | \\ R_1 \quad R_3 \end{array}$$

or

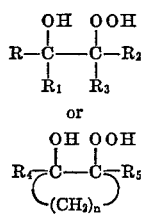

wherein: R, $R_1$, $R_2$ and $R_3$ are respectively members of the group consisting of H and alkyl containing from 1 to 18 carbon atoms, provided their total number of carbon atoms does not exceed 18, $R_4$ and $R_5$ are respectively members of the group consisting of H and alkyl containing from 1 to 17 carbon atoms, provided their total number of carbon atoms does not exceed 17, and $n$ is an integer from 1 to 18, and a process for preparing that compound, are disclosed.

---

This invention relates to hydroxy-hydroperoxides and to a process for the preparation thereof.

It is known that under certain conditions it is possible to carry out the hydroperoxidation of compounds containing a hydroxyl group, but the resulting product is always the gem hydroxy-hydroperoxide. This reaction takes place according to the following scheme:

$$\begin{array}{c} \diagdown\!\!\diagup\text{H} \\ \text{C---OH} \\ \diagup\!\!\diagdown \end{array} \xrightarrow{\text{hydroperoxidation}} \begin{array}{c} \diagdown\!\!\diagup\text{OOH} \\ \text{C} \\ \diagup\!\!\diagdown\text{OH} \end{array}$$

It is also known that by reacting olefins with peroxides or hydroperoxides, oxidation to the corresponding epoxide can take place according to the following scheme:

$$\begin{array}{c} \diagdown\!\!\diagup \\ \text{C=C} \\ \diagup\!\!\diagdown \end{array} \xrightarrow{\text{hydroperoxide or peroxide}} \begin{array}{c} \text{O} \\ \diagdown\!\!\diagup\!\!\diagdown\!\!\diagup \\ \text{C-----C} \\ \diagup\quad\quad\diagdown \end{array}$$

We have now found that, if an olefin is reacted with a suitable carrier of oxygen in the oxidized state, in presence of a suitable catalyst, it is possible to obtain the corresponding β-hydroxy-hydroperoxide in a good yield.

Accordingly, one aspect of the present invention provides a 2-hydroxy-hydroperoxide compound having in its molecule a group having the following formula:

$$\begin{array}{c} \text{OH} \quad \text{OOH} \\ \diagdown\! | \quad\quad | \!\diagup \\ \text{C-----C} \\ \diagup \quad\quad \diagdown \end{array}$$

According to another aspect of the present invention, there is provided a process for preparing the compounds of the invention, which process comprises reacting a compound having at least one ethylenic unsaturation with either (a) oxygen and an oxygen-carrier or (b) an oxidized oxygen-carrier, in the presence of a catalyst comprising an oxygen-containing metal compound, so as to produce the desired product.

Examples of suitable carriers of oxygen are those compounds having the following general formula:

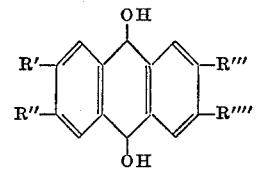

wherein each of R', R'', R''' and R'''', which may be the same or different, is hydrogen or any other substituent e.g. an alkyl radical having from 1 to 6 carbon atoms, a halogen atom, or a sulphamidic radical. These compounds may be prepared by, for example, hydrogenation of the corresponding quinones.

Examples of suitable catalysts are the oxygen-containing compounds of metals capable of giving peroxidic derivatives, e.g. oxygen-containing compounds of Mo, W, Se, Te, Co and V. The metals in these compounds are preferably in the highest oxidation state. Of these, the molybdenum compounds, which are described in the specification of our co-pending patent application, Ser. No. 855,739, filed of even date herewith, which may have a monomer or dimer structure, in the form of molybdenum alkylene dioxy derivatives give very good results.

These particular compounds have one of the following general formulae:

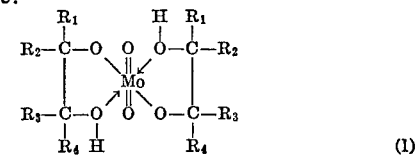

(1)

and

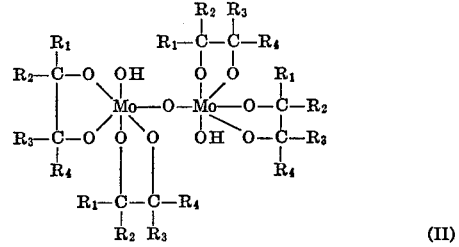

(II)

wherein each of $R_1$, $R_2$, $R_3$ and $R_4$, which may be the same or different, is a hydrogen atom, an unsubstituted or substituted hydrocarbon radical having from 1 to 10 carbon atoms, or a group having one of the formulae $$\begin{array}{c} \text{O} \\ \| \\ -\text{C}-\text{R}' \end{array}$$

—COOR, —CN, —CONH$_2$, and —NO$_2$, where R is a hydrocarbon radical having from 1 to 10 carbon atoms, or where $R_1$ and $R_4$, and/or $R_2$ and $R_3$ may form a bivalent hydrocarbon radical.

The reaction of the process according to the present invention is in accordance with the following:

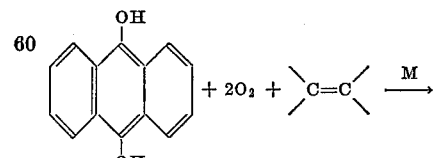

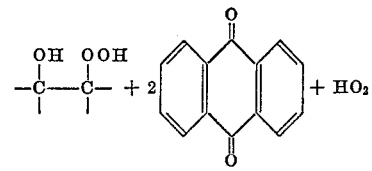

where M represents the oxygen-containing metal compound.

The resulting anthraquinonic compound can be easily hydrogenated to give the initial oxygen carrier and then recycled to the synthesis.

Examples of compounds containing ethylenic unsaturations, which can be reacted to give the hydroxy-hydroperoxides of the present invention include cyclic or acyclic olefins having from 2 to 20 carbon atoms, diolefins having from 4 to 20 carbon atoms, unsaturated alcohols having from 3 to 20 carbon atoms, unsaturated esters or ethers having 4 to 20 carbon atoms, unsaturated nitriles having from 3 to 20 carbon atoms.

The yields of the products of the reaction in question range from 50 to 70% if use is made of the known usual derivatives of the aforesaid metals, owing to competition by decomposition radical reactions either by the initial active oxygen or by the transferred oxygen. We have now found that the transfer of the active oxygen to the olefin is quantitative if the reaction is carried out in presence of a molybdenum alkylene-dioxy-derivative. The stability of hydroperoxides is very high in the presence of such a compound for a long time, even at temperatures higher than room temperature; this is because these compounds do not cause radical reactions.

The preparation of the hydroxy-hydroperoxide is generally carried out at a temperature in the range from 30° to 100° C. and at a pressure in the range from 1 to 100 atmospheres. The most satisfactory working conditions are determined by the choice of olefin, since its nucleophilic activity regulates the kinetic course of the reaction.

The reaction preferably takes place in a solvent, usually a polar solvent e.g. an ether or an ester, and proceeds very well in an aromatic-type solvent or in a mixture thereof with an alcohol. The choice of the solvent depends on the intended method of isolating the final product. This isolation is generally an extraction process, because of the relative stability of the hydroxy-hydroperoxide.

The reaction is experimentally conducted by treating a solution of the oxygen carrier with excess olefin (generally in a ratio 1:6) at temperatures and pressures lying within the ranges mentioned above, and by noting the disappearance of the active oxygen, using an iodometric test.

The reaction is stopped when the peroxide content is exactly 50% of the peroxide fed. The hydroxy-hydroperoxide which is obtained is extracted from the reaction mixture and separately isolated, or used in solution. In the lower cases, this extraction is effected with water, but in the other cases it is effected with alcoholic solvents or in ion exchange units at a controlled pH.

The hydroxy-hydroperoxides of the present invention can be employed for the same purposes as alkyl or aryl hydroperoxides, or as intermediate in the production of the corresponding glycols, or for the preparation of carbonilic compounds having a particular structure.

The following Examples illustrate the present invention.

EXAMPLE 1

A suspension of 78.5 g. of 2-ethyl-hydroanthraquinone in 250 g. of a mixture of 50 parts by weight of benzene and 50 parts by weight of octyl alcohol was oxidized with molecular oxygen at room temperature and room pressure. 8.2–8.3 litres of gas were absorbed.

Iodometric analysis showed that the solution had a hydroperoxide stoichiometrically equal to the absorbed oxygen. Then, to the oxidized solution contained in pressurized bottles were added 30 mg. of molybdenum alkylene-dioxy derivative having the formula:

$$MoO_2[(CH_3)_2C(OH) \cdot CH_2O\text{---}]_2,$$

and 100 g. of isobutylene. The resulting solution was heated with stirring to 60° C.; after 85–90 minutes it was cooled and extracted with 3 50 ml. aliquots of water. The olefin excess was quantitatively recovered and the quinone was recycled. The aqueous solutions were combined and showed an active oxygen content corresponding to 49.2% of the oxygen fed to the suspension; yield=98%.

The 2-methyl-2-hydroperoxy-1-propanol was separated by evaporation of the solvent at a reduced pressure, followed by distillation under vacuum. The product had a boiling point of from 67 to 69° C. at $10^{-4}$ mm. It was obtained in a yield of 32.8 g. (94%), but contained a small amount of the corresponding glycol.

EXAMPLE 2

116 g. of propylene and 30 mg. of the Mo catalyst defined in Example 1 were added to a solution of anthraquinone hydroperoxide identical to that described in Example 1. The solution was maintained under a pressure of 8 atmospheres and at 60° C. for 195 minutes and was then treated in a manner similar to that described in Example 1. 28.3 g. of product were obtained in a yield of 93.4 with respect to the theoretical yield. The product was a viscous liquid having a boiling point of 73 to 77° C. at $5.10^{-5}$ mm.

EXAMPLE 3

The procedure of Example 1 was repeated except that the isobutylene was replaced by 108 g. of cyclohexene. The reaction was stopped after from 49 to 52 minutes. The solution, which was at room pressure, was extracted four times with 30 ml. aliquots of water. The solution was concentrated under vacuum and 39.6 g. of semi-solid and low melting residue were obtained in a yield of 91%; the active oxygen content was 97% owing to impurites consisting of the corresponding glycol and adipic aldehyde.

EXAMPLE 4

To 350 ml. of a molar solution of anthraquinone-hydroperoxide in a benzene-iso-octanol mixture (1/1 by volume) were added 30 g. of distilled allyl alcohol and 30 mg. of the molybdenum alkylene-dioxy derivative of the Example 1. The solution was maintained with a thermostat at 50° C. with stirring for 160 minutes, cooled to room temperature and extracted with 3 50 ml. aliquots of water. Iodometric analysis of the active oxygen in the combined aqueous solutions gave a value of 47–48% based on the fed peroxide. The water was evaporated under vacuum at room temperature together with the excess of the allyl alcohol.

34.4 g. of a residue were obtained, which was a very viscous liquid. It was impure because it contained water and glycerol and it had a hydroperoxide content of about 91.5%. The analyses were performed with potassium iodide in a water-acetic acid mixture at room temperature.

The product decomposed upon long heating and could not be distilled. It was purified up to a hydroperoxide content of 93% by repeated precipitations from tertiary-butanolic solutions with benzene or petroleum ether.

What we claim is:

1. A process for the preparation of a 2-hydroxy-hydroperoxide of a compound selected from the group consisting of isobutylene, propylene, cyclohexene and allyl alcohol, said process comprising:
    (a) reacting 2-ethylhydroanthraquinone with oxygen in an organic solvent at room temperature; then
    (b) reacting the resulting product with isobutylene, propylene, cyclohexene or allyl alcohol, in the presence of molybdenum alkylene dioxy catalyst having the formula $MoO_2((CH_3)_2C(OH) \cdot CH_2O\text{---})_2$ at a temperature of from 30 to 100° C.

2. Process according to Claim 1, wherein the reaction is carried out at a pressure of from 1 to 100 atmospheres.

3. Process according to Claim 1, wherein the reaction of step (b) is carried out in the presence of an organic solvent selected from the group consisting of benzene, octanol, isooctanol and mixtures thereof.

4. A process as claimed in Claim 1, wherein said olefin is isobutylene.

5. A process as claimed in Claim 1 wherein said olefin is propylene.

6. A process as claimed in Claim 1 wherein said olefin is cyclohexene.

References Cited

UNITED STATES PATENTS 2,782,219   2/1957   Cleaver _____ 260—610 R

OTHER REFERENCES

Cleaver: "Chem. Abs.," Vol. 52, pp. 2058–2059.

BERNARD HELFIN, Primary Examiner

W. B. LONE, Assistant Examiner